Dec. 7, 1948.   G. SLAYTER   2,455,907
APPARATUS FOR MELTING GLASS
Filed April 15, 1944   2 Sheets-Sheet 2
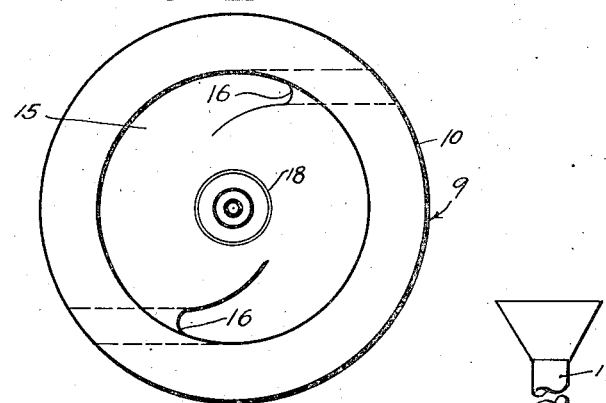
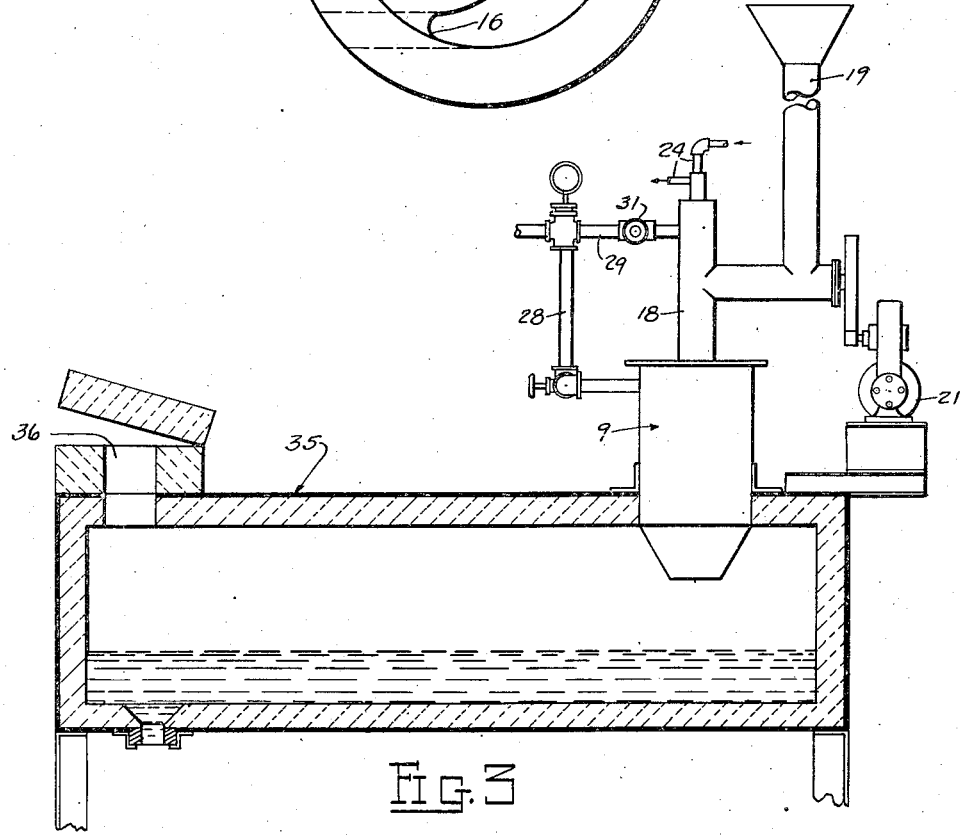
INVENTOR.
*James Slayter*
BY
*Stalnaker & Overman*
Attorneys.

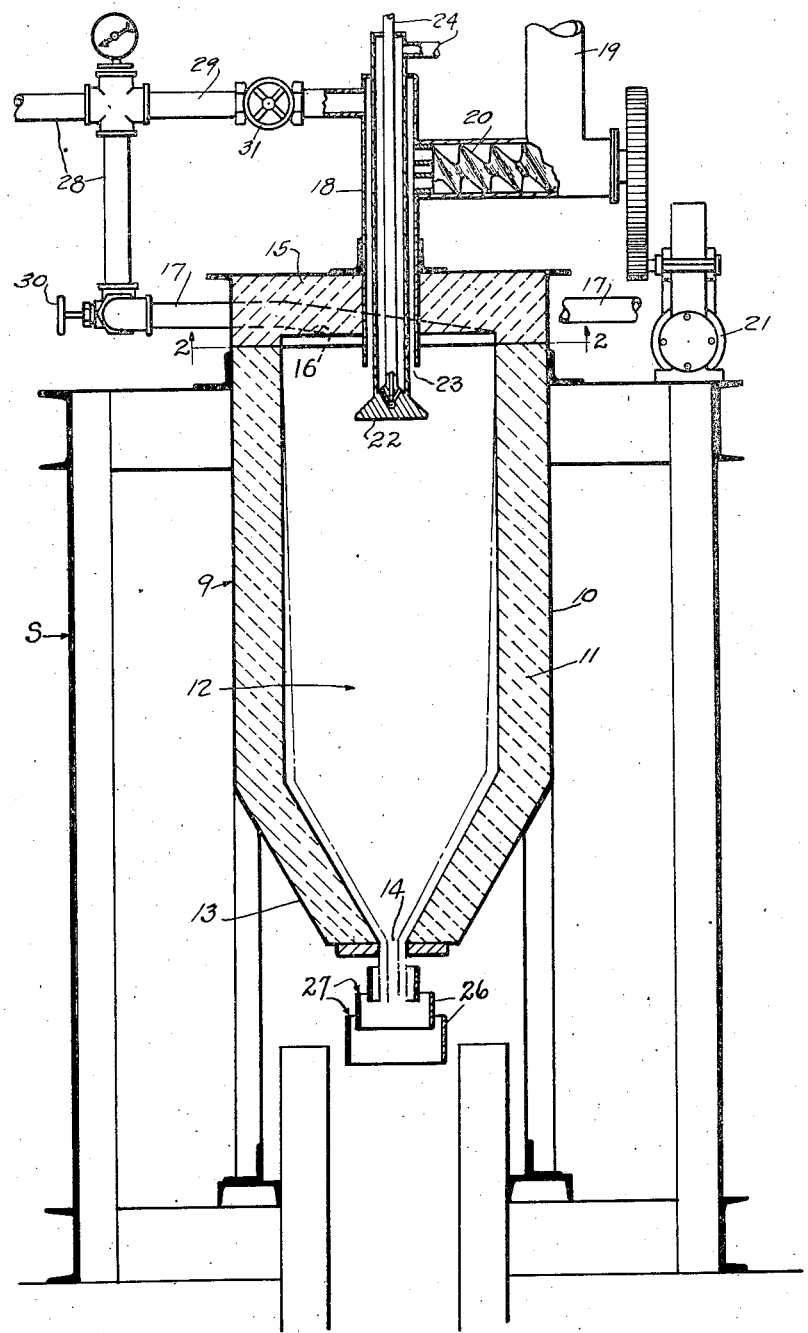

Patented Dec. 7, 1948

2,455,907

UNITED STATES PATENT OFFICE 2,455,907

APPARATUS FOR MELTING GLASS

Games Slayter, Newark, Ohio, assignor to Owens-Corning Fiberglas Corporation, a corporation of Delaware Application April 15, 1944, Serial No. 531,219

6 Claims. (Cl. 49—1)

This invention relates to an improved apparatus for melting and refining glass.

One generally accepted practice of melting glass is to provide a large capacity tank divided into a melting chamber and a refining chamber by a partition or bridge wall apertured to enable molten glass to flow from the melting chamber to the refining chamber. As molten glass is withdrawn from the refining chamber, glass batch is added to the melting chamber so that the process of melting and refining the glass is more or less continuous.

The foregoing practice relies principally upon the force of gravity to separate the gas bubbles from the body of molten glass and upon diffusion to obtain uniformity and homogeneity of the molten glass. Since the viscosity of molten glass is relatively high, it follows that the refining process is accomplished at a very slow rate. In fact, the rate of refining the glass is so slow in most cases that considerable quantities of glass must be maintained in a molten state for long periods of time in order to insure an ample supply of refined glass for even a small continuous requirement. This, of course, is objectionable, not only because of the large storage capacity required for the refined glass, but also because of the high heat losses resulting from maintaining the glass continually in a molten state well above the devitrification point.

An improved glass melting technique includes rapidly melting and mixing minutely divided glass batch materials, refining the material and quickly removing it for fabrication while in a molten state and while it still retains a great amount of the melting heat. This process, it will be noted, makes unnecessary the maintenance of a large body of glass which must be held at a high temperature until used. The temperature required for melting the batch is relatively higher than that needed to maintain the glass in a molten state and it follows that where it is possible to employ the glass immediately the advantage of the melting heat even though somewhat reduced may be realized and no additional heat will be required.

With the above in view it is the primary object of the present invention to provide a glass melter into which dry batch materials may be continuously fed and substantially instantaneously reduced to a molten and refined state.

It is a further object of the invention to suspend the particles of batch in a gaseous medium and heat the particles while thus suspended to melt the batch, thereby facilitating the transfer of heat to the batch, and then collecting the heated and melted batch in a thin film to assure ready egress of gas from the molten material.

Another object of this invention is to maintain a positive pressure within the melter during the melting operation and to discharge the molten glass through a restricted orifice in the melter under the influence of a high velocity "sting-out" or the products of combustion escaping through the orifice. As a result, the molten glass is discharged in a continuous stream from the melter as soon as the batch reaches a fluid state.

Still another object of this invention is to provide a melter wherein the glass batch is introduced into the melter through the top of the latter and wherein provision is made to maintain a pressure on the incoming batch which is at least as great as the pressure within the melter so that escape of the products of combustion upwardly through the batch is prevented.

A further object of this invention is to provide a melter in the form of a refractory lined hollow body having means for producing a swirling flame in the body and also having means for directing the incoming batch into the flame. The construction is such that the finely divided particles of the glass batch are rapidly brought up to melting temperature in the swirling flame and are deposited on the heated wall of the melter where they combine with other particles in a molten state to form a fluid mixture of glass.

A still further feature of this invention is to provide a melter of the above character wherein the molten glass collects on the side of the melter and flows downwardly over the heated refractory lining into the high velocity stream of the products of combustion escaping through the restricted discharge orifice at the bottom of the body or chamber. As the molten glass flows downwardly along the hot walls of the chamber it may well be in the form of a continuous sheet and as it becomes more viscous may divide into a number of streams. The streams may recombine and mix with other streams flowing down the wall which reacts to cause a refining of the glass by liberating such gases as are formed or entrapped during the melting.

A glass melter of the present type is especially adapted for use in connection with a refining tank where it is desired to maintain a substantial supply body of molten glass for large fabricating operations. A plurality of melters may be arranged to discharge the molten glass formed thereby into a common pool. This process provides a substantially continuous flow of molten glass into the pool which is at least partially heated by means of the "sting-out" or the escaping products of combustion from the melter orifices.

The refractory materials from which furnace wall blocks are made are subject to chemical attack and erosion by the glass particularly in the melting zone where an extremely high degree of heat is employed. An important advantage of the present type melter lies in the fact that the type of construction is substantially less expensive to manufacture or replace than the usual glass melting furnace. When a unit of the present type becomes worn or useless, it may readily be replaced without disturbing the other melting units or interrupting the use and operation of the refiner.

Still another object of this invention is to employ the high velocity stream of the products of combustion escaping through the discharge orifice for the purpose of blowing the molten glass issuing from the orifice to form glass wool. In this application of the invention it is desirable to insure maintaining the glass issuing from the discharge orifice in the stream of the products of combustion escaping through the orifice, and it is a further object of the invention to accomplish this result by surrounding the molten glass with atmosphere under sufficient pressure to counteract any tendency for the blast to spread or deflect the molten glass out of the stream as it leaves the discharge orifice.

A further application of the present melter may include the use of a trough disposed beneath the discharge orifice to receive glass flowing therefrom and convey it in a continuous stream to suitable fiber forming apparatus. Heat from the "sting-out" maintains the glass in a flowable condition.

The foregoing, as well as other objects, will be made more apparent as this description proceeds, especially when considered in connection with the accompanying drawings, wherein:

Figure 1 is a semi-diagrammatic side elevational view partly in section of an improved glass melting furnace embodying the present invention;

Figure 2 is a cross-sectional view taken on the plane indicated by the line 2—2 of Figure 1; and Figure 3 is a fragmentary sectional view showing the improved melter in connection with a forehearth.

In general, the present invention embodies principles adapted for rapidly converting premixed glass batch materials, cullet or the like to molten glass. An increased rate of melting and refining may be obtained by introducing the batch continuously into a heated chamber in relatively small amounts which readily combine to produce a complete glass composition. The molten glass issuing from the melter is free of stones or particles of unmelted batch and is in a substantially refined condition. This condition is obtained by the manner in which the melting of the batch takes place.

The melting chamber is of vertically disposed cylindrical shape and is preferably lined with refractory material or a metal which is non-reactice to the glass batch as will be described in detail presently. Oil, gas or other fuel in the form of premixed fuel and air is introduced tangentially to the axis into the top of the chamber, either from one or opposite sides thereof. The melter forms the combustion chamber for the gas mixture which expands upon contact with the heated walls with considerable turbulence and thereby develops a high velocity. This velocity is greatly increased by the reduced size of the discharge orifice at the bottom of the melter which results in the building up of pressure therein. The flow of the products of combustion is generally in a spiral or cyclonic manner along the chamber wall and when batch is introduced into or near the vortex formed by the flames it is thrown with great force onto the wall.

The temperature within the chamber is sufficiently high to substantially instantaneously melt the fine batch which moves by gravity and the influence of the flame down the chamber wall. The glass forms a thin coating on the wall just below the burner openings near the top of the chamber and is in a fluid state so that it flows readily along the wall. The adhesion of the glass to the wall retards the movement of the portion of the glass film in contact therewith so that there is relative movement between the inner and outer "surfaces" of the film.

The volume of glass discharged from the melter is governed in part by the rate at which batch is fed thereto and which in turn is limited to the rate at which the batch can be reduced to a molten state.

The surface of the glass exposed to the flame has a slightly higher temperature and is more fluid than the glass nearer the wall. This "slipping" of the glass becomes a mixing or stirring action by means of which seeds or gas bubbles formed by the melting batch are liberated and increases in magnitude as the volume of glass increases. The continued flow of glass down the chamber wall provides additional planing or fining action and as the volume of glass increases due to the gradual lowering of temperature, the entire body becomes a relatively homogeneous mass. The degree of homogeneity obtained is a result of inertness of the wall material to the type of glass batch employed. The molten glass tends to "wash out" the refractory and chemically acquire properties from the wall. This, of course, does not occur where a metallic lining such as, for instance, platinum is used and a relatively higher degree of homogeneity is realized.

One form of apparatus by which the present invention may be accomplished is illustrated in Figure 1 of the drawings wherein I have shown a vertically arranged cylindrical glass melter 9 comprising a sheet metal casing 10. The casing is lined with a refractory material 11 to form a chamber 12 therein and has an inverted frusto conical section 13 at the bottom provided with a restricted discharge opening 14. The melter may be mounted on a suitable frame or supporting structure S. The top of the chamber 12 is closed by a slab 15 of refractory material, shown in Figure 2 of the drawing, and formed with diametrically opposed recesses or pockets 16 for receiving suitable gas burners 17. The burners 17 are directed tangentially of the chamber and cooperate with one another to produce a swirling or cyclonic flame in the chamber, the exhaust gases exiting through the opening 14. The fuel supplied to the burners may be an air-gas mixture previously mixed and fed to the burners under a low pressure. The fuel is ignited within the chamber 12 which serves as a combustion chamber for the burners so that a high degree of heat is developed for melting the batch. The burning gases expand within the chamber and produce a high velocity "sting-out" flame which may be employed directly to form fibers from the molten glass produced by the melter or for heating a conditioning chamber for the glass.

For the purpose of illustration, the glass batch is shown in Figure 1 of the drawing as fed into the chamber 12 through a chute 18 coaxially arranged with respect to the chamber and communicating at a point above the chamber with a hopper 19 containing a vertical column of the batch. The batch is transferred from the hopper 19 to the chute 18 through a tubular casing having a feed screw 20 suitably rotatably supported therein and driven by an electric motor 21.

As the glass batch is discharged into the chamber 12 from the lower end of the chute 18, the finely divided particles are immediately impinged by the swirling flame and reduced to a molten state in which condition they are deposited on the wall of the chamber by the centrifugal force created by the flame. The foregoing is accomplished by providing a distributor 22 supported at the discharge end of the chute 18 in axial alignment with the latter and having a conical surface for uniformly spreading the particles of the batch outwardly into the swirling flame. The distributor 22 is formed with a jacket 23 communicating with a pair of tubes 24 which extend upwardly through the chute 18 to a suitable source (not shown) of coolant. As a result, coolant is circulated through the distributor 22 during operation of the melter and damaging of the distributor by the heat generated in the melter is avoided.

The above construction is such that glass melted in the chamber 12 by the swirling flame collects on the side walls of the chamber and flows downwardly along the walls to the discharge orifice 14 at the bottom of the chamber. As stated above, the inner surfaces of the chamber walls are formed of a refractory material and are, of course, maintained at a high temperature by the flame so that the glass is refined in the manner previously disclosed as it flows to the discharge orifice 14.

It will also be observed from the foregoing that the products of combustion escape from the interior of the chamber 12 through the same orifice 14 employed to remove the molten glass from the chamber. This orifice 14 is restricted to such an extent that a positive pressure is maintained in the chamber and, as a result, the products of combustion escape through the orifice 14 at a relatively high velocity. The above feature is advantageous because it materially accelerates removal of molten glass from the chamber and the escaping gases may be employed for heating a receptacle into which the glass is discharged.

In Figure 1 of the drawings, however, the blast or high velocity stream of the products of combustion is employed to attenuate the molten glass escaping through the orifice and form glass wool. One difficulty encountered in forming glass fibers directly from molten glass issuing from the orifice 14 is to maintain the glass within the effective region of the blast of the products of combustion escaping through the same orifice. The molten glass has a tendency to spread outwardly away from the blast at the discharge side of the orifice since the glass completely surrounds the blast in substantially tube-like form. This tendency may be overcome by producing sufficient pressure around the glass, as it issues from the orifice 14, to maintain the molten glass in effective intimate contact with the blast. One means of accomplishing the above results is to arrange a plurality of axially aligned relatively short tubes 26 at the discharge side of the orifice in concentric relation to the blast of the products of combustion flowing through the orifice 14. The tubes successively increase in diameter in the direction of the flow of the products of combustion and cooperate to form annular spaces 27 through which air flows in the directions shown in response to the passage of the products of combustion through the tubes 26. This flow of air creates sufficient pressure around the blast to urge the molten glass into the blast and thereby facilitate attenuation of the molten glass into fibers.

It will be understood from the foregoing that some arrangement must be made to prevent the escape of the products of combustion upwardly through the chute 18. In general, the above is accomplished by providing a pressure in the chute above the batch supplied to the chute by the feed screw 20 which is at least as great as the pressure within the chamber 12. In detail, the fuel supply conduit 28 for the burners 17 communicates with the upper end of the chute 18 by means of a branch conduit 29 so that the pressure at the top of the material in the chute 18 is substantially the same as the pressure produced in the chamber 12 by the products of combustion from the burners 17. Suitable valves 30 and 31 may be, respectively, incorporated in the conduits 28 and 29 in positions to enable independently varying the fuel under pressure supplied to the chute and chamber 12. The escape of products of combustion through the batch in the feeding screw casing 20 is prevented by the height of the column of the batch maintained in the hopper 19. In other words, the height and weight of the column of the batch in the hopper is predetermined to seal the feeding mechanism against escape of the products of combustion from the chamber 12.

In the form of the invention illustrated in Figure 3 the melter 9 is shown in connection with a covered forehearth 35 or refining tank into which molten glass from the melter is discharged. A series of melters may be provided, the glass from each flowing into a common pool when a large supply body of glass is needed for large fabricating operations such as, for instance, with glassware forming machines. The products of combustion from the melters provide a high degree of heat within the tank which is utilized to maintain the glass molten and induce further refining within the collective pool. A port 36 or stack may be provided in the tank cover to permit the escape of the products of combustion and reduce the pressure built up therein.

As previously pointed out, one of the series of melters may be removed from the tank and a new one replaced without stopping the operation of the other melters or the use of the forehearth. This is particularly advantageous since in the usual type of glass melting furnace the entire operation must be stopped when repairs are to be made.

1. An apparatus for forming glass fibers comprising a hollow body having a discharge opening at the bottom through which both molten glass and products of combustion escape from the body, a plurality of gas burners arranged to produce a swirling flame in the body, means for introducing glass batch materials into the body under a fluid pressure at least equal to the pressure of the gas entering said burners and for directing the batch outwardly into the flame to melt the batch, said body being substantially sealed against the escape of products of combustion except for the discharge opening aforesaid which is restricted to such an extent that sufficient pressure is built up in the body to discharge the products of combustion at a high velocity through the opening, and means outwardly of the body for directing the flow of molten glass into the high velocity stream of the products of combustion to form the glass into fibers.

2. A glass melter comprising a hollow cylindrical body having an inwardly and downwardly tapering lower portion provided with a restricted discharge opening at the bottom through which both molten glass and products of combustion escape from the body, means for continuously supplying glass batch materials under fluid pressure into the body, means for producing a swirling flame in the body to melt the batch, said body being substantially sealed against the escape of products of combustion except for the discharge opening aforesaid which is restricted to such an extent that sufficient pressure is built up in the body to discharge the products of combustion at the velocity required to fiberize the molten glass passing through said opening, and means supported below the body for urging the molten glass issuing from the discharge opening into the center of the blast of the products of combustion passing through said opening.

3. A glass melter, comprising a hollow cylindrical body having fuel gas burners arranged to produce a swirling flame within the body and having a discharge opening for the products of combustion restricted to enable a pressure to be built up within the body, a vertical chute for continuously supplying glass batch materials into the body, means for directing the batch outwardly into the swirling flame, means connecting with the source of fuel gas providing a fluid pressure on the batch in the chute which is at least as great as the pressure in the body to prevent the escape of the products of combustion upwardly through the chute, and means outwardly of the body for directing the molten glass into the high velocity stream of the products of combustion escaping through said opening.

4. Apparatus for making glass fibers comprising a hollow body having therein a chamber for burning gases, means for feeding material to be converted to molten glass into the chamber at the upper portion thereof and means for introducing combustible gases into the chamber to be burned therein to thereby convert the material fed into the chamber into molten glass, a discharge opening in the lower portion of the chamber through which the molten glass and the products of combustion of the combustible gases pass and being so proportioned that the pressure built up in the chamber by the combustible gases is sufficient to discharge the products of combustion of the gases at a velocity that will draw out the molten glass into fibers, and means for directing a tubular blast of air along the path of and in engagement with the stream of molten glass and products of combustion issuing from said discharge opening to aid in the attenuation of the molten glass by the products of combustion.

5. The apparatus of claim 4 in which the means for directing a tubular blast of air along the path of and in engagement with the stream of molten glass and products of combustion issuing from the discharge opening includes an open-end conduit enclosing a part of the said path of the molten glass and products of combustion to cause the induction of atmospheric air along the said path to aid in the attenuation of the molten glass by the products of combustion.

6. The apparatus of claim 4 in which the means for directing a tubular blast of air along the path of and in engagement with the stream of molten glass and products of combustion issuing from the discharge opening includes a plurality of conduits enclosing a part of the said path of the molten glass and products of combustion, said conduits being arranged concentrically and one past the other in the direction of travel of said stream with each conduit larger in diameter than the preceding one to thereby cause the induction of atmospheric air along the said path to aid in the attenuation of the molten glass by the products of combustion.

GAMES SLAYTER.

REFERENCES CITED

The following references are of record in the file of this patent:

UNITED STATES PATENTS

| Number | Name | Date |
|---|---|---|
| Re. 20,282 | Powell | Aug. 16, 1938 |
| 1,371,084 | Ferguson | Mar. 8, 1921 |
| 1,500,651 | Smith | July 8, 1924 |
| 1,756,381 | Pahl | Apr. 29, 1930 |
| 1,769,181 | Jackson | July 1, 1930 |
| 1,964,915 | Haswell et al. | July 3, 1934 |
| 2,006,947 | Ferguson | July 2, 1935 |
| 2,038,251 | Vogt | Apr. 21, 1936 |
| 2,131,599 | Shrum | Sept. 27, 1938 |
| 2,165,242 | Drill | July 11, 1939 |
| 2,178,059 | Zier | Oct. 31, 1939 |
| 2,212,448 | Modigliani | Aug. 20, 1940 |
| 2,268,546 | Forter | Jan. 6, 1942 |
| 2,331,944 | Von Pazsiczky et al. | Oct. 19, 1943 |

FOREIGN PATENTS

| Number | Country | Date |
|---|---|---|
| 57,227 | Norway | Oct. 26, 1936 |
| 551,272 | Germany | May 28, 1932 |
| 651,687 | Germany | Oct. 18, 1937 |
| 780,140 | France | Jan. 24, 1935 |